C. H. BLOMSTROM.
STEERING MECHANISM.
APPLICATION FILED AUG. 19, 1919.
1,352,868.
Patented Sept. 14, 1920.
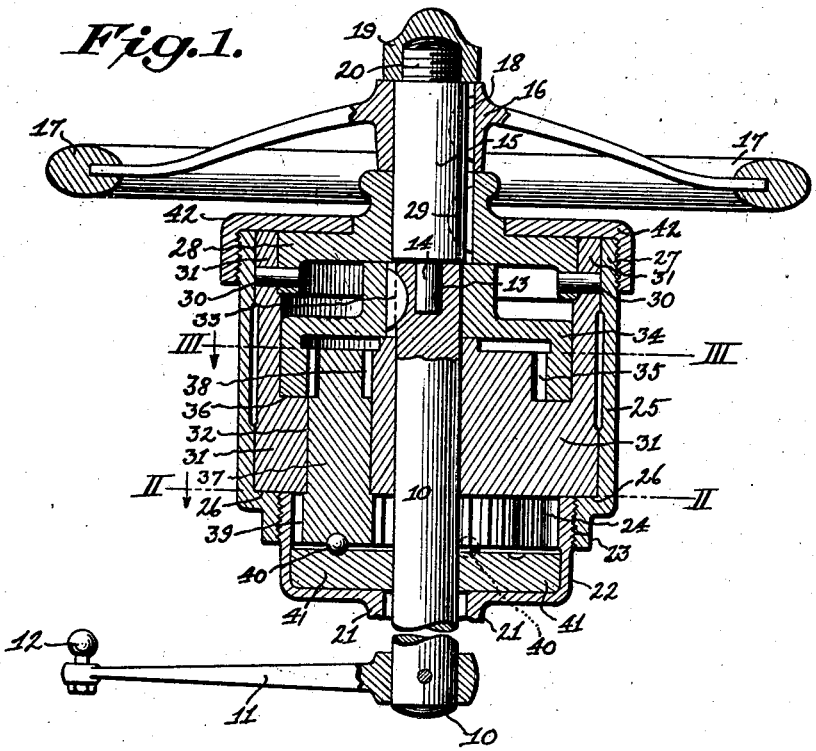
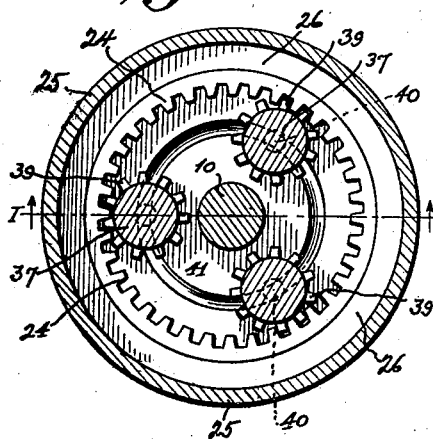
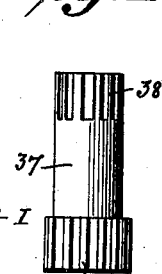
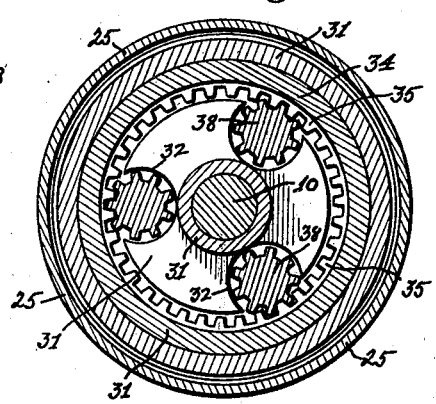
Witness
Chas. L. Grieshaber
Inventor
Carl H. Blomstrom,
By W. Schoenborn
Attorney

UNITED STATES PATENT OFFICE.

CARL H. BLOMSTROM, OF DETROIT, MICHIGAN.

STEERING MECHANISM.

1,352,868.   Specification of Letters Patent.   Patented Sept. 14, 1920.

Application filed August 19, 1919. Serial No. 318,480.

*To all whom it may concern:*

Be it known that I, CARL H. BLOMSTROM, residing at Detroit, in the county of Wayne and State of Michigan, have invented certain new and useful Improvements in Steering Mechanism, of which the following is a specification.

My invention relates to an improved arrangement of compound epicycle train of gears which is particularly adapted to be used in connection with the steering mechanism of self-propelled vehicles, presses, lifting jacks, hoisting, and analogous devices in which it may be desired to automatically lock the elements operated upon in any of its adjusted positions.

The objects of my invention are,

First, to construct a mechanism of the character described in which a small amount of power is required to operate the same and to so devise and arrange the several parts thereof as to permit them to be compactly inclosed in a small casing which is located in an easily accessible position thereby permitting the same to be readily installed in all places and positions, quickly inspected or taken apart for cleaning or repairs without the necessity of detaching any of the elements of construction to which said mechanism is applied.

Second, to construct a mechanism of the characteristics referred to in which any desired ratio between the several coöperating gears can be employed, provided for or substituted and hence any ratio of power be determined upon for operating the steering mechanism or parts connected thereto.

Third, to construct and arrange a mechanism as above indicated in which is provided a simple and inexpensive power transmission device capable of automatically and irreversibly locking itself in any of its adjusted positions, and said adjustments being adapted to be easily and quickly effected with a minimum of power.

Fourth, to construct an arrangement of parts which are dust proof and capable of being easily and readily applied to or substituted for existing forms of steering mechanism without much expense or disturbing the standard or adopted arrangement of steering rods or connections employed by the several well known automobile manufacturers.

Fifth, other objects and advantages of the invention will appear from the detailed description of the several parts and their mode of operation to be hereinafter given.

My invention consists of structural characteristics and relative arrangements of elements which will be hereinafter more fully given and particularly pointed out in the appended claims.

In the drawings in which similar reference characters indicate the same parts in the several figures, Figure 1 is a vertical section of the preferred form of my invention as applied to and arranged in coöperative engagement with a steering hand wheel and shaft of an automobile and taken on line I—I of Fig. 2.

Fig. 2 is a section taken on line II—II of Fig. 1.

Fig. 3 is a section taken on line III—III of Fig. 1, and

Fig. 4 is a side elevation of one of the compound planetary pinions detached from the mechanism.

Referring to the drawings, 10 is a solid shaft forming the usual and well known steering-shaft which has provided at its lower end the common form of arm 11, which is engaged through a ball and socket joint 12 with one end of the usual connecting rod having its other connected with the steering-knuckles, not shown, and forming no part of the present invention.

In the upper end of said steering-shaft 10 is formed a socket 13, adapted to receive and form a bearing for the reduced end 14 of a stub-shaft 15 and on the upper end of said stub-shaft 15 is secured the hub 16 of the steering wheel 17 by any suitable key 18, as shown. 19 is a nut engaging the reduced and threaded upper end 20 of the stub-shaft 15 for the purpose of securing the steering wheel 17 thereon and at the same time provide a smooth finish to said shaft 15.

A hollow upright or tube 21, secured in any suitable manner (not shown) at its lower end to the floor or frame of the automobile body, forms the stationary steering post, said tube or hollow post being expanded or enlarged at its upper end 22 and provided with threads 23 on its outer side and an internal gear 24 on its inner side, for purposes to be presently described, said gear 24 being made in a separate piece and suitably keyed or fixed to the inner side of the upper end 22 of said post or tube 21 or made integral therewith as shown. Secured to the upper end 22 of the post or tube 21 by means of the threads 23 is an extension forming a circular fixed casing 25 having a lower inner shoulder 26 and an upper externally threaded end 27, said casing 25 forming not only a part of a dust-proof housing but at the same time a firm and rigid support and simple bearing for the rotary and movable elements of the invention.

28 is a driving flange fixed to the lower or inner end of the stub shaft 15 by means of a key 29 or otherwise, said flange 28 having its outer or rim section suitably secured by means of pins 30 to a planetary gear carrying arm or disk 31 which disk is rotatably supported or carried on the shoulder 26 and loosely fitted within the fixed casing 25 as clearly shown in Fig. 1 and said arm or disk 31 is provided with one or more circular openings 32 for purposes to be presently explained.

To the upper end of the steering shaft 10 is fastened by a key 33 a rotatable arm or disk 34 provided with an upper and movable internal gear 35 and said gear 35 and arm or disk 34 are so proportioned and arranged as to be rotatably supported within and on a shoulder 36 of the arm or disk 31. In each of the one or more circular openings 32 of said arm 31 is rotatably disposed and carried a compound planetary gear 37, (see Fig. 4), having an upper pinion 38 in engagement with the internal gear 35 and a lower pinion 39 in mesh with the internal gear 24, and each of said planetary gear or gears 37 is preferably carried by a simple ball bearing 40 held in position by a lower collar 41, loosely seated in the cup-shaped end at the enlarged upper section 22 of the stationary steering post 21 and interposed between said gears 37 and post 21, but any other means may be used for supporting said gears 37, if so desired.

An internally screw threaded cap 42 is adapted to engage the upper externally threaded end 27 of the fixed casing 25 and is constructed to snugly and loosely surround the outer circular section of the driving flange 28, and when said cap 42 is screwed down, as shown in Fig. 1, all the parts comprising the moving or rotary elements of the invention are properly held within the fixed housing or casing 25 and with respect to each other to efficiently carry out fully the functions assigned to them, and all exterior grit and dust will be excluded from the casing interior or stopped coming in contact with said rotary elements, and at the same time any lubricant within said casing will be uniformly distributed to all rotary and rubbing parts and prevented from escaping to the exterior.

While I have shown and prefer to employ three planetary gears 37, this number may be decreased or increased, and the construction as illustrated enables the power to be uniformly distributed at different radial points, thereby avoiding all side thrust or tendency to cramp or chock the gears, and enables many teeth to take up the load at one time instead of one or two.

Assuming the parts assembled, as shown in Fig. 1, the operation of the invention is as follows:

When the hand or steering wheel 7 is turned in either direction in the act of steering the self-propelled vehicle, the rotation of the attached stub-shaft 15 is transmitted to and rotates the driving flange 28 with its connected pinion carrying arm or disk 31, said disk or arm 31 carrying with it the rotatably supported compound planetary gears 37. The planetary gears 37 having their lower ends by means of pinions 39 in mesh with the lower fixed internal gear 24, will be forced to not only revolve around the axis of the steering shaft 10 but also rotate on their own axes which rotary motion is transmitted to the upper pinion 38. Pinion 38 being in engagement with the upper and movable internal gear 35 transmits its motion to and rotates the upper rotatable arm or disk 34 which will cause the steering shaft 10 connected therewith to rotate and at a much slower speed or less circumferential distance than the hand steering wheel 17 and said rotation of the shaft 10 will by means of the arm or link 11 be conveyed to and properly guide the front steering wheels to which it is connected, as clearly understood and needs no further explanation.

Owing to the gear ratios or difference between the diameters of the internal gears 24 and 35 and that of the intermediate planetary gears or pinions 38 and 39, and the structure, arrangement and manner of interposing the driving flange 28 with its connected arm or disk 31, with respect to said shafts 10 and 15, internal gears 24 and 25 and pinions 38 and 39 and attached parts, much less power is required to turn the hand wheel 17 to steer the vehicle, and at the same time effects a novel function of automatically locking the adjusted position of said steering shaft 10 against any movement by an extraneous force applied to said shaft 10 or its connected arm 11.

The ratio of the gears may be varied to suit any particular or nature of work for which the mechanism is desired, and while I have shown thirty-six teeth on the internal gear 24, thirty-four teeth on the internal gear 35, nine teeth on pinion 38 and eleven teeth on pinion 39, this relation can be easily and cheaply changed and without departing from the essential features of the present invention in providing a steering mechanism which can be operated with little power and at the same time automatically locks itself in any of its adjusted positions against a counteracting force exerted upon the steering wheels caused by an obstruction or other unforeseen impediment in the roadbed preventing the direct and smooth running of said wheels.

It will also be understood while I have shown my irreversible steering mechanism at the top of the steering post it may be interposed in any suitable position between the hand steering wheel and rods or links connected with the front wheels and yet be able to fully carry out all the functions and operate in the same manner and efficiency as herein disclosed.

From the foregoing disclosure of the construction and arrangement of the parts and their coöperation, it will be seen that all the objects, functions and advantages recited in the statement of invention have been fully, cheaply and efficiently carried out and accomplished with the simplest possible mechanism which can be quickly installed on any of the existing forms of automobiles or devices herein referred to.

What I claim is:—

1. An irreversible steering gear mechanism comprising a stationary member, a stationary internal gear carried by said member, a rotatable shaft supported by and extending through said stationary member and adapted to be attached to a steering gear, a rotatable internal gear attached to said rotatable shaft, a rotary wheel on said stationary member, a rotatable driving flange connected to said rotary wheel, two integrally connected planetary pinions rotatably supported on said driving flange and revolving around said rotatable shaft, one of which pinions is in mesh with the stationary internal gear and the other in mesh with the rotatable internal gear, whereby said rotatable shaft is capable of rotation within said driving flange by means of said wheel.

2. An irreversible steering mechanism comprising a stationary steering post, a stationary internal gear attached to said post, a rotatable steering shaft carried by said post and extending through said steering post and adapted to be attached to a steering gear, a rotatable internal gear attached to said steering shaft, a rotary hand wheel on said post, a rotatable driving flange actuated by said hand wheel, two connected planetary pinions rotatably supported on said driving flange and revolving around said rotatable shaft, one of which pinions is in mesh with the stationary internal gear and the other in mesh with the rotatable internal gear, whereby said steering shaft is capable of rotary adjustment within said driving flange by means of said hand wheel.

3. An irreversible steering mechanism comprising a stationary tubular steering post formed with an enlargement at its upper end, a rotatable steering shaft within said post and adapted to be connected to a steering gear, a hand wheel mounted upon the upper end of said enlargement and free to turn thereon and means within said enlargement interposed between said wheel and the upper end of and surrounding said rotatable steering shaft for rotating the shaft and transmitting from the wheel to the shaft a different rate of rotary speed than that of the wheel.

4. An irreversible steering mechanism comprising a stationary tubular steering post, a stationary internal gear carried by said post, a rotatable steering shaft within and extending through said post and adapted to be attached to a steering gear, a rotatable internal gear attached to said rotatable steering shaft, a hand wheel rotatable on said post, an independent stub shaft connected to said hand wheel and being in axial alinement with and rotatably supported by the adjacent end of said steering shaft, a rotatable driving flange connected to said stub shaft, two connected planetary pinions rotatably supported on said driving flange and revolving around said rotatable steering shaft, one of which pinions is in mesh with the stationary internal gear and the other in mesh with the rotatable internal gear, whereby said steering shaft is capable of rotary adjustment within said driving flange by means of said hand wheel.

5. An irreversible steering mechanism comprising a stationary tubular steering post formed with an enlargement at its upper end, a rotatable steering shaft within said post and adapted to be connected to a steering gear, a hand wheel mounted upon the upper end of said enlargement and free to turn thereon and rotary means within said enlargement interposed between said wheel and the upper end of and surrounding said rotatable steering shaft for rotating the shaft and transmitting from the wheel to the shaft a different rate of rotary speed than that of the wheel.

6. An irreversible steering mechanism comprising a stationary tubular steering post, a stationary internal gear carried by said post, a rotatable steering shaft within said post and adapted to be connected to a steering gear, a rotatable internal gear attached to said rotatable steering shaft, a hand wheel rotatable on said post, a rotatable driving flange connected to said hand wheel and surrounding and rotating about said steering shaft, two connected planetary pinions rotatably supported on said driving flange, one of which pinions is in mesh with the stationary internal gear and the other in mesh with the rotatable internal gear and revolving around said rotatable steering shaft, whereby said steering shaft is capable of rotary adjustment by means of said hand wheel.

7. An irreversible steering mechanism comprising a stationary tubular steering post, a stationary internal gear carried by said post, a rotary steering shaft within said post and adapted to be connected to a steering gear, a rotatable internal gear attached to said steering shaft, a hand wheel on said post, a stub shaft connected to said hand wheel, a rotatable driving flange connected to said stub shaft and surrounding said rotary steering shaft, two connected planetary pinions rotatably supported on said driving flange and revolving around said steering shaft, one of which pinions is in mesh with the stationary internal gear and the other in mesh with the rotatable internal gear, whereby said steering shaft is capable of rotary adjustment by means of said hand wheel.

In testimony whereof, I affix my signature.

CARL H. BLOMSTROM.